April 24, 1956
M. PIENTKEWIC
2,742,959
TIRE REMOVING DEVICE WITH CIRCUMFERENTIALLY
SPACED THRUST MEMBERS
Filed May 11, 1953
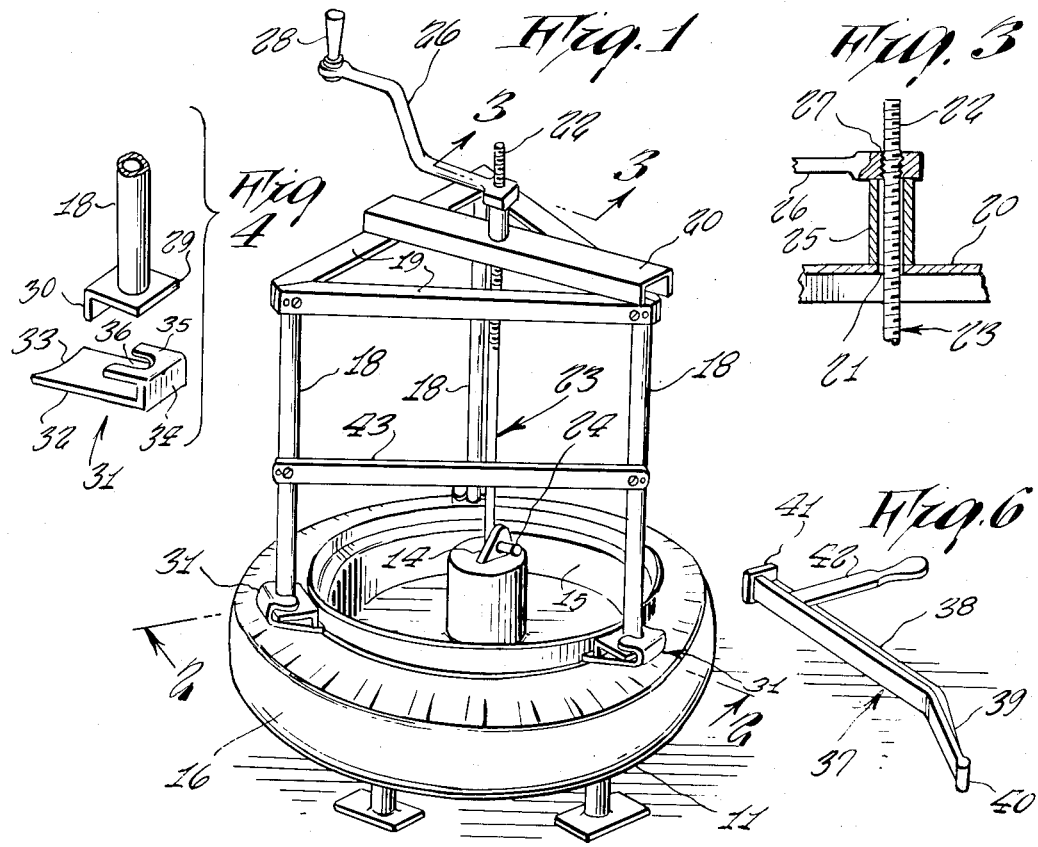
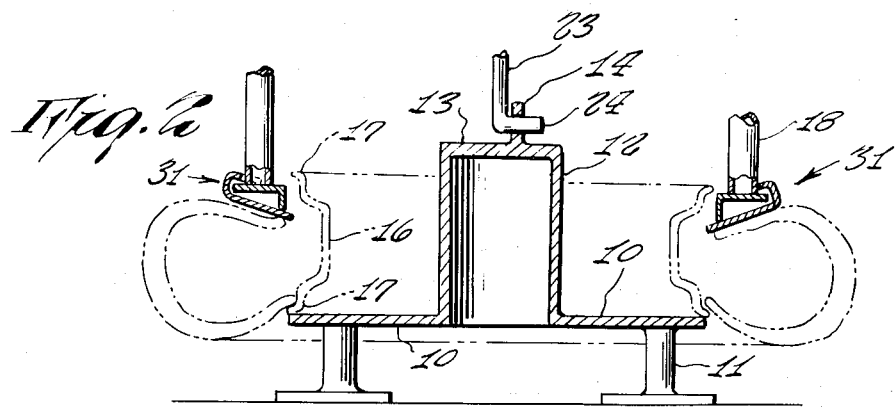
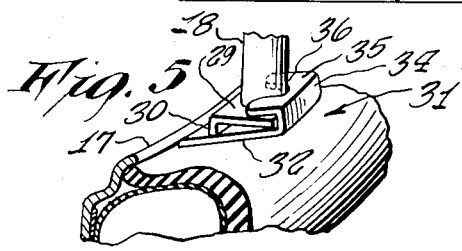
INVENTOR.
MARTIN PIENTKEWIC
BY J. Ledermann
ATTORNEY

United States Patent Office 2,742,959
Patented Apr. 24, 1956

2,742,959

TIRE REMOVING DEVICE WITH CIRCUMFERENTIALLY SPACED THRUST MEMBERS

Martin Pientkewic, Vulcan, Mich., assignor to The Vulcan Manufacturing Company, Vulcan, Mich., a corporation of Michigan Application May 11, 1953, Serial No. 354,000

1 Claim. (Cl. 157—1.2)

This invention relates to devices or apparatus for removal of pneumatic tires from their rims, and is particularly adaptable to relatively heavy or truck tires, as the device greatly facilitates the operation and lessens the time and labor ordinarily required for the latter purpose.

Another object of the invention is the provision of a device of the class above-mentioned, which is simple in construction and operation and inexpensive in cost of manufacture.

The above broad as well as additional and more specific objects will be clarified in the following description wherein characters of reference refer to like-numbered parts in the accompanying drawing. It is to be noted that the drawing is intended solely for the purpose of illustration, and that it is therefore neither desired nor intended to limit the invention necessarily to any or all of the exact details of construction shown or described except insofar as they may be deemed essential to the invention.

Referring briefly to the drawing,

Fig. 1 is a perspective view of the device, illustrating its application in removing a tire from its rim.

Fig. 2 is a sectional view taken on the line 2—2 of Fig. 1.

Fig. 3 is a sectional view taken on the line 3—3 of Fig. 1.

Fig. 4 is an exploded perspective view, with parts broken away and partly in section, of a detail.

Fig. 5 is a fragmentary perspective view, with parts broken away and partly in section, illustrating the application of the detail shown in Fig. 4 in urging the upper bead of the tire away from the rim.

Fig. 6 is a perspective view of an auxiliary tool which may be used, with a light hammer, to separate and force down the bead of the tire in extreme cases where rust formed on the rim tends to lock the bead to the rim.

Referring in detail to the drawing, the numeral 10 indicates a horizontal disc or platform supported on a plurality of legs 11. A column or hub 12 extends axially upward from the disc 10, and is covered by a roof 13 having an eyelet 14 extending upward therefrom.

As the first step in removing the tire 16 from its rim 15, the mounted tire is laid on the disc 10 with the flange 17 resting on the circumferential edge of the disc.

The device further comprises three substantially vertical posts 18. The upper extremities of the posts 18 are joined by ties 19. A rigid member, which may be in the form of an inverted channel as shown at 20, is mounted on the ties 19 and preferably positioned to extend from one apex of the equilateral triangle formed by the ties to the midpoint of the opposite tie, whence the member 20 passes through the projected axis of the hub 12. The rigid member 20 has a vertical opening 21 therethrough substantially intermediate its length, through which the threaded shank 22 of a rod 23 passes loosely; the lower end of the rod 23 is deformed to provide a hook 24 engaged in the eyelet 14. A loose vertical sleeve 25 surrounds the shank 22 and rests on the member 20. A crank 26 having a threaded opening 27 through that end thereof opposite its handle 28, is positioned horizontally and has the threaded shank 22 passing through and threadably engaging the opening 27.

Each post 18 has rigid with its lower extremity a plate 29 provided with a depending right-angled projection or tongue 30 on that edge of the plate nearest the hub 12 and which is tangential to an imaginary cylinder passing through the circumferential edge of the disc 10. For the bottom of each post 18 a loosely fitting shoe 31 is provided. This shoe is in the form of an L lying on its side and it has a width approximately equal to that of double the diameter of the post 18. In the drawing, for the sake of clarity and simplicity, the tongue 30 is shown having approximately the same length as the width of the shoe 31, as is also the plate 29; however, in actual use both the plate 29 and its tongue 30 may be of greater length than the width of the shoe in order to exercise pressure downward, as will presently become apparent, over a greater distance. Also, the edge of the plate 29 from which the tongue 30 extends may have a concave curvature of the same radius as that of the rim flange 17 in order to fit more snugly toward the latter, rather than being longitudinally straight, as shown for simplicity. Such modifications, however, may readily be made within the spirit of the present invention.

The shoe 31 comprises the lower and longest member or arm 32 whose free edge is concavely curved to conform to the curvature of the rim flange, as shown at 33. From the other or opposite end or edge of the arm 32, the base portion or member 34 of the L extends substantially at right angles, and the "hook" arm 35 of the L extends from the member 34 substantially parallel with the arm 32. The arm 35 is bifurcated to provide a rounded slot 36 through which the lower end of the post 18 may pass. The shoe is positioned in the manner shown in Figs. 1, 2 and 5, with the post 18 passing through the slot 36 and the tongue 30 pressing down upon the shoe arm 32 near the rim flange 17, the tongue 30 being positioned close against the latter, and that edge of the plate 29 opposite the tongue 30 engages the arm 32 adjacent the shoe portion 34.

The operation of the device is as follows. With the mounted tire positioned on the disc 10 as before mentioned, the remainder of the device is positioned as shown in Fig. 1, with the concave edges 33 of the shoes 31 close against the rim flange, and the hook 24 engaged in the eyelet 14. Turning of the crank 26 clockwise will cause the sleeve 25 to bear down upon the member 20 and the latter to bear down upon the posts 18, thus forcing the concave edges of the shoes 31 down against the bead of the tire. Owing to the sloping position of the arms 32 of the shoes, consequent to the structure above-described, the downward force thus exerted will be applied directly against the tire bead to separate it from the rim flange, which is most desirable since the maximum adhesion of the tire to the rim occurs between these parts. Continued turning of the crank forces the shoes 31 to travel on downward so that the top bead of the tire first meets the bottom bead, then separates the latter from the rim and pushes it off, and finally the shoes push the top bead off the lower edge of the rim so that the tire falls to the ground.

In extreme cases where rust formation has caused unusually tenacious adhesion of the tire bead to the rim, the auxiliary tool shown at 37 in Fig. 6 may be used. This tool comprises a shank 38 having a short deformed lower end 39 provided at its extremity with a rolled or cylindrical enlargement 40, the other end of the shank having a broadened preferably flat head 41. A handle 42 extends from the shank 38 near the head 41. By positioning the tool approximately upright with the end 40 placed between the tire bead and the rim flange, a few strokes on the head 41 with a light hammer will sever the adhesion of the tire bead to the rim. It is believed that this description of the use of the tool 37 suffices without illustrating its application in the drawing.

Obviously, modifications in form or structure may be made without departing from the spirit or scope of the invention as defined in the appended claim.

Appropriate intermediate horizontal ties, of which but one is shown at 43, may be provided as desired, to add rigidity to the device.

I claim:

A device for removing a mounted tire from its rim comprising a horizontal circular platform having legs supporting the same, said mounted tire being adapted to be positioned on said platform with the flange of the rim resting on the circumferential edge of the platform, said platform having an upwardly extending hub thereon substantially coaxial with said platform and said hub having an eyelet in the top thereof, an upwardly extending threaded rod having a hook on its lower end engaging said eyelet, a plurality of equidistantly spaced circumferentially arranged posts lying in an imaginary cylinder of a diameter greater than that of the rim but lesser than that of the tire and concentric with said platform, means including a plurality of like ties joining the upper extremities of said posts for maintaining said posts in substantially vertical position, a rigid member supported on at least two of said ties and having an opening therethrough in alignment with said rod, said rod passing loosely through said opening, a horizontal crank having a handle at one end and a threaded hole through the other end thereof, the upper end of said rod above said rigid member passing threadably through said crank hole, a spacer sleeve surrounding said rod between said rigid member and said crank, said posts having plates rigid with the lower ends thereof, each of said plates having one edge lying tangential with respect to said rim flange, each of said edges having a downwardly extending tongue adapted to engage the tire bead to push the latter downward away from the rim flange upon rotation of said crank to force said rigid member downward, a tire engaging shoe on each of said plates, each of said shoes comprising an elongated flat arm and a relatively short extension thereon at right angles thereto from one end thereof and a relatively short extension doubled back over said long arm from said first-named short extension, said second-named short extension having a bifurcation therein providing a slot, each of said shoes being removably attached to the lower ends of said posts with the lower end of the post passing through said slot and the outer edge of said plate positioned between said short arms and said tongue resting on said long arm of the shoe near the free end of said long arm, said free end of said long arm being concavely curved and being positioned on said tire bead closely adjacent said rim flange, said long arm owing to the aforesaid engagement of said shoe with the lower end of said post and said plate and tongue thereof sloping downward toward the axis of the rim whereby upon said rotation of said crank and said consequent downward pushing of said plate said free end of said long arm strongly urges said tire bead downward from said rim flange.

References Cited in the file of this patent

UNITED STATES PATENTS

| | | |
|---|---|---|
| 1,567,276 | Kowalzcyk et al. | Dec. 29, 1925 |
| 2,436,003 | Gosselin | Feb. 17, 1948 |
| 2,442,714 | Stack | June 1, 1948 |
| 2,489,088 | Hewitt | Nov. 22, 1949 |
| 2,495,118 | McCollister | Jan. 17, 1950 |
| 2,536,139 | Ritter | Jan. 2, 1951 |
| 2,538,759 | Briggs | Jan. 23, 1951 |
| 2,580,926 | Johnson et al. | Jan. 1, 1952 |
| 2,612,214 | Zang | Sept. 30, 1952 |